United States Patent [19]

Johnson

[11] 4,132,077
[45] Jan. 2, 1979

[54] PROCESS AND APPARATUS FOR OBTAINING USEFUL ENERGY FROM A BODY OF LIQUID AT MODERATE TEMPERATURE

[76] Inventor: Don E. Johnson, 256 N. Fraser Dr. West, Phoenix, Ariz. 85203

[21] Appl. No.: 764,762

[22] Filed: Feb. 2, 1977

[51] Int. Cl.² ............................................. F01K 25/06
[52] U.S. Cl. ....................................... 60/649; 60/673; 60/674
[58] Field of Search ................. 60/649, 673, 674, 650, 60/682

[56] References Cited

U.S. PATENT DOCUMENTS

| | | | |
|---|---|---|---|
| 1,162,052 | 11/1915 | Hall | 60/649 X |
| 3,190,072 | 6/1965 | Berryer | 60/671 |
| 3,908,382 | 9/1975 | Stone, Jr. | 60/649 |
| 4,041,710 | 8/1977 | Kraus | 60/673 |

Primary Examiner—Allen M. Ostrager
Attorney, Agent, or Firm—Edwin M. Thomas

[57] ABSTRACT

Process and apparatus are disclosed in which a very cold gas, e.g. air, is injected into an upflowing stream of water to aerate and help lift the liquid at accelerated velocity. The gas-liquid mixture is discharged at high velocity into a separating zone converting dynamic energy into pressure energy; gas flows out to drive an expansion engine while the liquid next flows to a deep storage zone, entrapping gas as it descends at considerable velocity. The expanding gas is cooled by expansion and returned to the first stage. Meanwhile, the entrapped downflowing gas is allowed to collect above the liquid in deep storage under pressure, from whence it can be released for expansion, as in an engine, with further cooling to lower still further the temperature of the gas going to the first step. In a modification, a very cold gas, such as liquid nitrogen, may be used in the first step, means being provided for obtaining work and reliquefying the latter gas. The system can be used to lift water at moderate temperature to considerable distances above underground aquifers.

21 Claims, 13 Drawing Figures

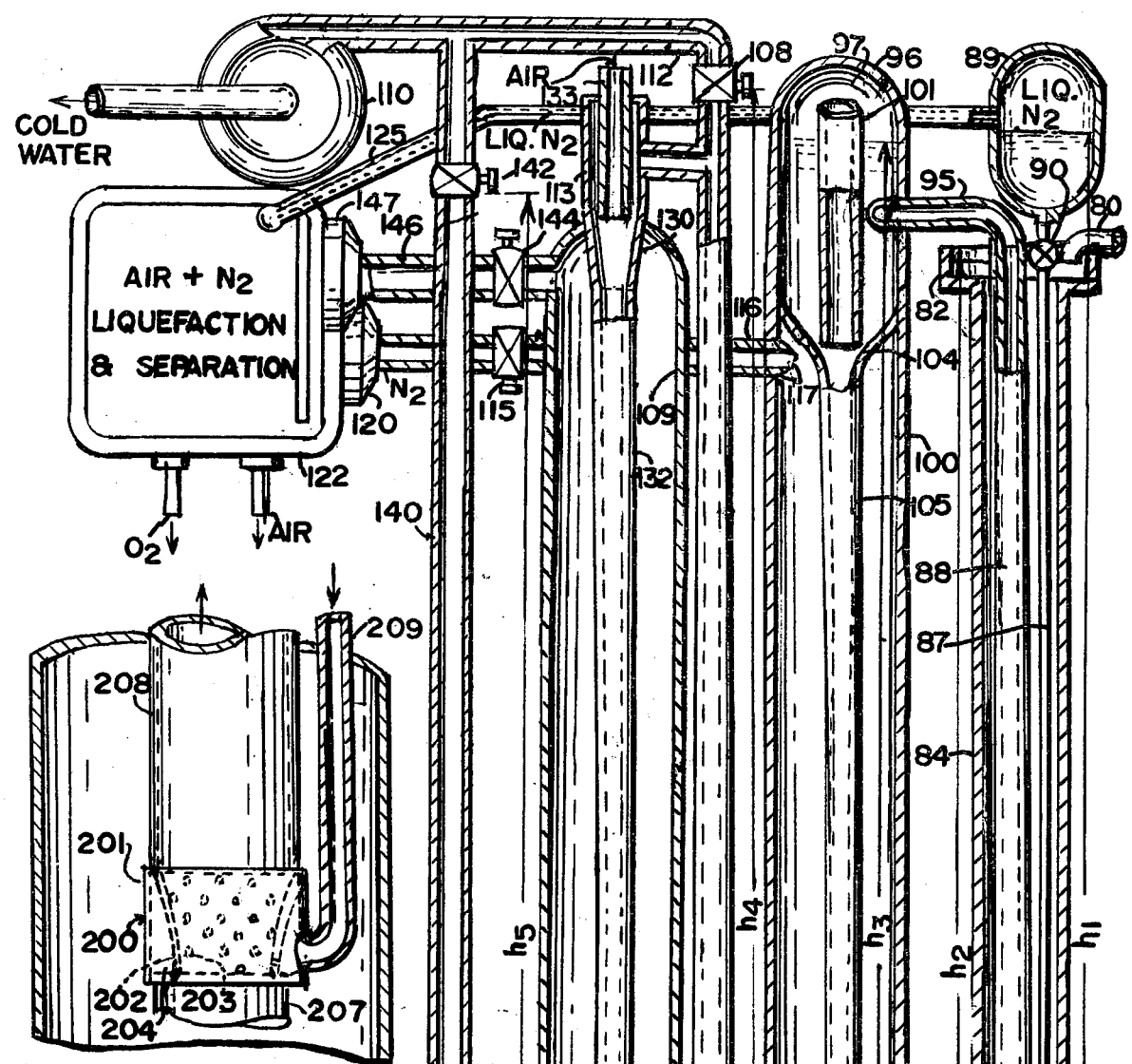
Fig. 2
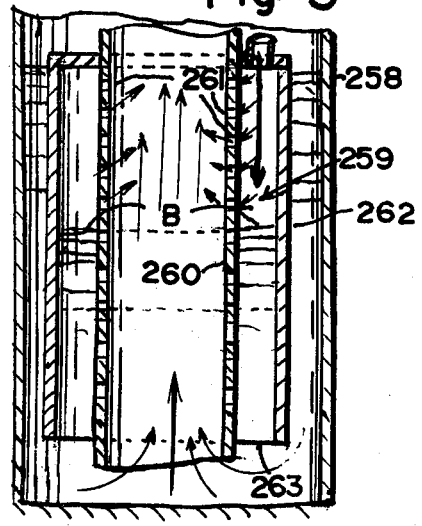
Fig. 3
Fig. 10

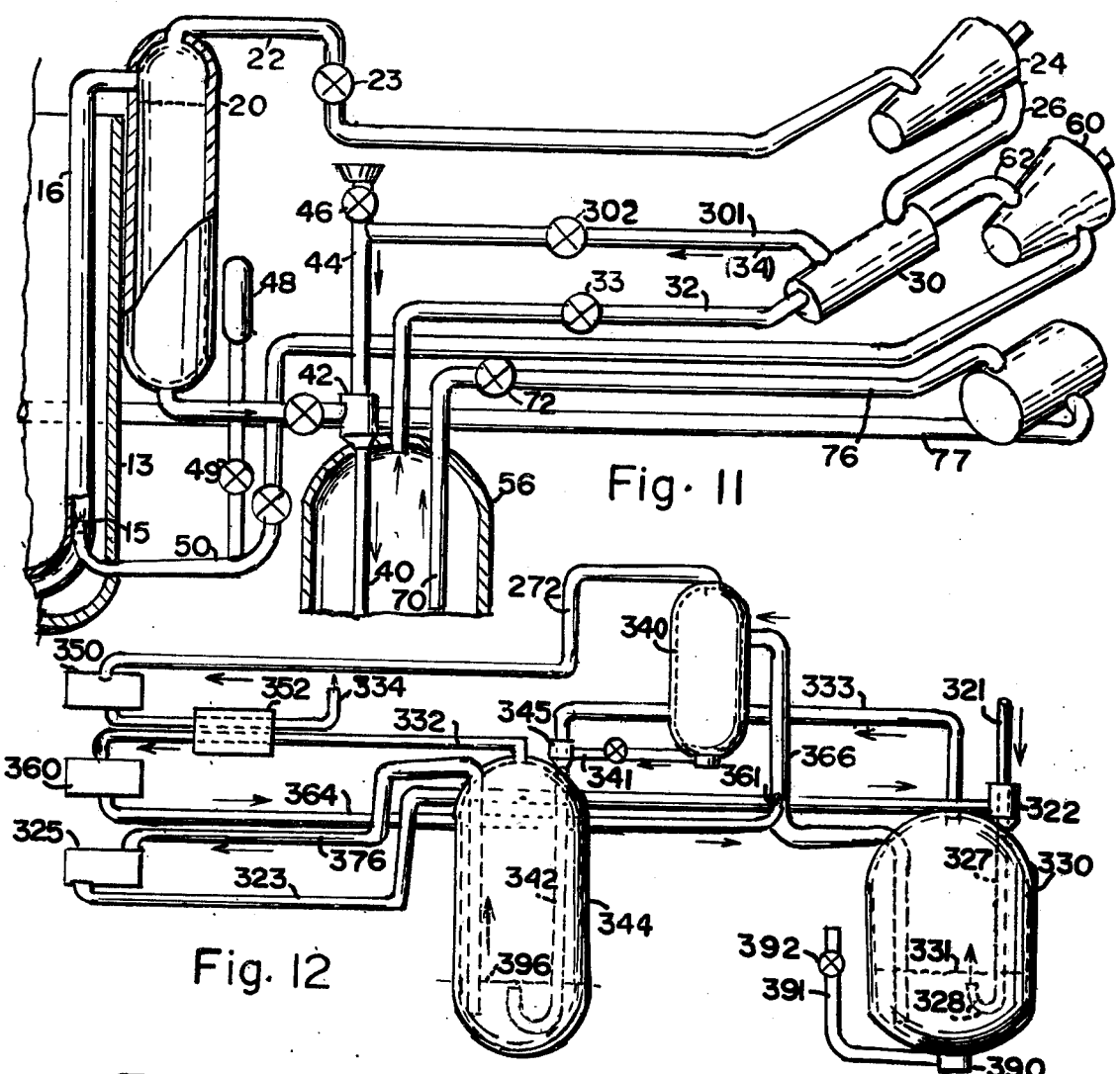
Fig. 11
Fig. 12
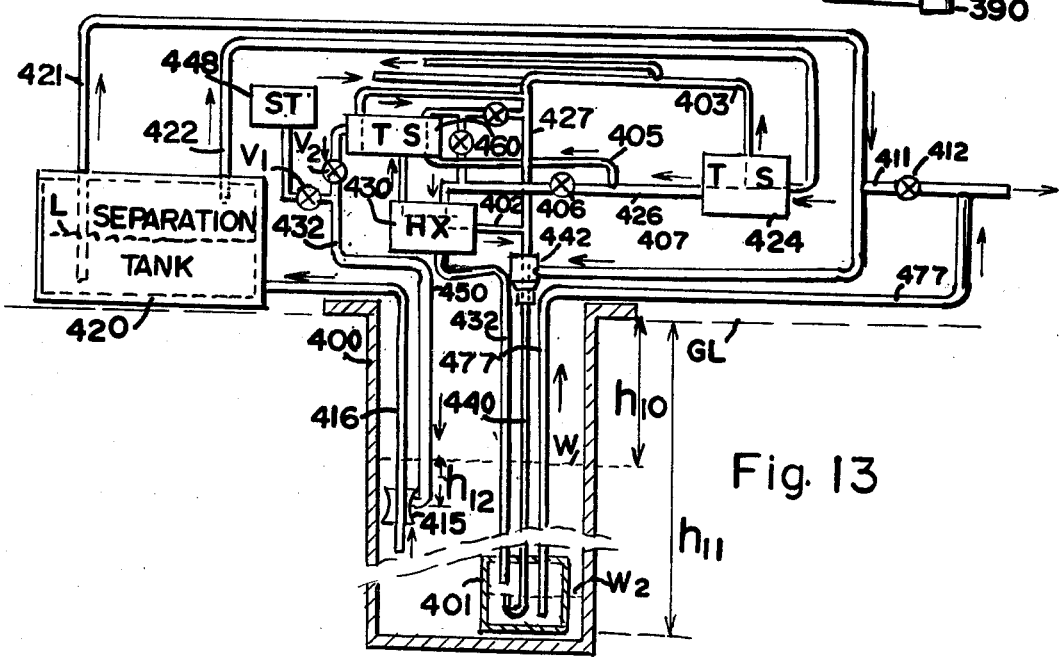
Fig. 13

PROCESS AND APPARATUS FOR OBTAINING USEFUL ENERGY FROM A BODY OF LIQUID AT MODERATE TEMPERATURE

BACKGROUND, PRIOR ART, AND SUMMARY OF THE INVENTION

Because of a widespread concern over future energy needs and supplies, many and various proposals have been made or are being made to utilize alternative fuels and energy sources to supplement or replace some of the conventional sources of energy and power. Many suggestions have been made for the use of natural non-fuel sources of energy, such as wind, waves, solar heat, and hot water from geothermal sources, and the like. Proposals also have been made to store quantities of water and/or other fluids under pressure or at sites where they have potential energy to replace of supplement other sources of energy. Many suggestions have been made for use of water, compressed air, etc., as temporary energy storage in connection with intermittent power or energy sources such as the wind, wave, sun, etc. Some of these include the storage of water in underground caverns under hydrostatic pressure or pressure of compressed air, or the use of such stored water to generate power as it descends and to consume surplus energy when it is pumped back to the surface or to higher elevations during periods of low power consumption, etc. Among these are Fessenden U.S. Pat. No. 1,247,526, Claytor U.S. Pat. No. 2,230,526, and Haanens U.S. Pat. No. 3,806,733, relating to storing power obtained from wind energy for times when the wind is not blowing, etc. As far as applicant is aware, none of these schemes has been adopted on a significant commercial scale, probably because the costs of installation would be so high that a reasonable return on investment might not be obtainable.

Other proposals have been made for using non-fuel sources, such as the heat of the sun, the heat of geothermal waters, that of underground rock formations deep in the earth, and the like in various ways. Some of these have merit and may eventually become commercially important but they require further study, innovation and substantial investments of capital to be adopted widely. Proposals have been made also to recover heat from mild temperature bodies of water. Some such uses have been developed. The present invention is related to these. It contemplates the use of a very cold gas to extract heat energy from water that may be at only a moderately warm temperature, too low to generate steam or vapors having significant pressure or conventionally useful heat content. By using as working fluid a gas at very low temperature, compared to that of the water, a wide temperature gradient is available and by making use of gas entrainment in flowing streams to establish dynamic operating conditions, and to pressurize the gas, considerable useful energy may be obtained with relatively small capital investment.

Processes and equipment are well known for transferring some of the heat from a body of warm water to another body, using gas such as air as a heat transfer medium. By first effecting heat exchange between a gas and warm water, and then further heat the gas by compression, heat may be transferred by the working fluid to other bodies or systems, such as process water, space heating systems, or the air in an enclosed space, as in heating residental and other buildings occupied by people. The well known heat pump operates on this principle, using as transfer medium a condensible refrigerant gas or the like. In a conventional type of heat pump, for example, a volume of cool working gas is passed in heat exchange with a moderately warm fluid body, such as warm water, to pick up some of the heat of this water. The partially warmed gas is next compressed mechanically, by a power driven pump, to add further heat to it, or to condense it, after which it is taken to a second heat exchange stage where it gives up part of its heat to the body that is to be warmed. Thereafter, it is expanded, with consequent cooling, and returned to the first water source to pick up further heat, and the cycling is repeated. In such a process, it is to be noted that heat is taken from a lower temperature body and transferred at higher temperature, imparted by mechanical work, to another body. Of course, the conventional heat pump is reversible and can be used for refrigeration but when used to heat a body, it takes heat from a lower temperature body, adds to this heat by performing relatively expensive mechanical work on the working fluid, and then is expanded and recycled after it gives up its transferable heat.

The present invention makes use of a cycle that is just the reverse of this. Heat is taken up by a very cold working gas, from a warm or mild temperature body of fluid, such as water, cooling the water in the process. The energy taken up by the cold gas in this step is used for two general purposes, the first to build up potential energy in the system, as will be described, and the second, to obtain useful motive energy or shaft power. All other steps or components of the system are at lower temperature than the water, so this may be appropriately called an inverse heat pump (IHP) cycle or apparatus. It makes use, too, of the principle of entraining a large amount of the working gas into a rapidly flowing stream of liquid to aerate the latter, and to affect its specific gravity and velocity of flow properties so as to (1) achieve dynamic flow conditions which will be convertible into potential or pressure energy and (2) to compress the gas in a downflowing stream and thereby build up a reservoir of compressed gas above a body of water, both water and gas thereby being placed under enough pressure to do useful work as they are released from storage. Some of the individual steps or equipment to accomplish the several operations just mentioned are known in the prior art but the present invention combines them in a novel manner to achieve new and unexpected results. The present invention therefore makes use of some well known apparatus and process steps to extract energy from bodies of water and the like, which hitherto have not yielded energy in significant quantities.

The use of aeration, i.e., injection of air or other gas into an upwardly flowing column of water to lift it to a higher elevation has been known and used in the past. In a recent U.S. Pat. No. 3,808,445, to Bailey a system is proposed which would use a jet of air, injected from a compressed air source, to lift a column of water from a subterranean source to a site high above the ground. Then in time of need the water is allowed to flow down to generate power. Another step of the present process involves entraining air into water which is flowing downwardly, using the ancient principle of the trompe. The trompe was once used for supplying a stream of air to a forge or the like. It operated by entraining air bubbles, finely dispersed, into a downflowing stream of water, then letting them escape at the bottom into a closed space above the water. This placed both the water and the air under pressure to a degree related to the head of water, with its entrained bubbles, in the descending column. This principle has had some successful applications in mining in years past but has not been used in recent years, as far as the present applicant is aware, except for a use described in the Hancock et al patent, U.S. Pat. No. 3,754,147, in which the present applicant is a joint coinventor.

In the present invention, a stream of very cold gas is introduced in very small bubbles and as uniformly as possible across the cross section of an upflowing stream of water which is under some pressure. In a typical example, assume that a sizable stream of water is available from any suitable source, at a temperature of about 100° F. Further, assume that the air or gas to be introduced has been precooled to a low temperature, e.g., below −100° F. The temperature difference of over 200° F. or more between gas and water, obviously makes it possible to transfer a large quantity of heat from water to the air. Small gas bubbles, introduced into the flowing water stream under pressure sufficient to distribute them well therein, rise with the stream accelerating its upward flow and rapidly expanding as they absorb heat, as they progressively come under lower hydraulic pressure to confine them. As a result, the velocity of the upflowing stream is greatly accelerated to the delivery point where the water and bubbles are introduced into a large quiescent separating zone. Due to the dynamic flow at high velocity, a substantial pressure is developed in the separating zone, according to the well known Bernoulli principle. The upflowing water was already under some pressure; it has been lifted to a substantially higher elevation plus being put under additional pressure when its dynamic energy has been converted, so that now its potential energy has been very considerably increased. The separating air, rising into storage above the upper water level in the storage or separating zone, is under the same elevated pressure as the separated water at its upper surface. This air can then be led out to and through an expander where it produces substantial motive power or shaft energy (e.g., in a turbine). It is very considerably cooled as it expands. In this highly cooled condition, it is next passed in transfer with another body of gas enroute to a second expander, as will be explained further. Exhaust gas from the second stage expander, which is also highly cooled, is then taken back to the point of injection into the rising stream of feed water, and that part of the process is repeated.

Meanwhile, a separate cycle of operation is taking place. The water from the separating zone, considerably cooled by its heat exchange with the cold gas, is under considerable pressure from gas above and is elevated substantially above its original point of entry into the system. It therefore has considerable potential (and pressure) energy. It is permitted to flow downwardly to considerable depth, preferably below the ground level, and at a relatively high velocity. As it does so, another stream of air or other gas is aspirated or injected by venturi action to aerate this downflowing stream with myriads of small bubbles. As the water continues its downward flow, these bubbles are compressed and become progressively smaller. The act of compressing them, which is done isothermally or essentially so, adds heat energy to them, according to well known gas laws. If the gas is cold when it enters, which is preferred, it first may take up a small amount of heat from the downflowing water stream, but the compression tends to counteract and to overcome this cooling process so, in most cases, the gas adds some heat overall to the water. Or to state it another way, the heat added to the gas by compression is taken up by the water. In the exemplary case mentioned above, assuming the water is at a temperature of about 100° F., at the outset, it may be cooled to about 88° F. by addition of very cold air in adequate quantity as it flows up into the separating zone. When it flows down, cold air aspirated into it may reduce this slightly at first, but ordinarily there will be a small temperature rise, of the order of two or three degrees F.

This downflowing water, and the gas or air bubbles which accompany it, are discharged upwardly in a storage or pressure chamber which may be hundreds of feet below the surface of the ground. Depending on the depth, and on the flow velocity and initial pressure on the downflowing stream of water, which acts as a gas compressor as it descends, pressure of the gas in the lower storage zone may be of the order of 200 psig. or more, and the applied pressure on the water will be the same. The air, or other gas may be taken from this compressed storage directly through a second expander. But preferably, it is taken in heat exchange with the exhaust gas from the first expanders to warm the latter somewhat and to cool itself before it enters the expander. The reason for this is that this gas, on exhaust from the second expander, is to be at the very cool temperature needed for injection into the original feed water, as previously explained.

The water in storage under pressure in the subterranean cavity (or other pressure site), may be released through a pressure control valve, to drive a water motor and generate additional motive power. Thereafter, if desired, it may be returned to the source at a significantly lower temperature than it had in the first place.

Variations and modifications of the system may include the use of a liquefied normally "permanent gas", such as liquid nitrogen, in place of the very cold air introduced into the rising stream of water. This has the advantage of picking up considerable additional heat from the heat source liquid, as the cold liquid is gasified. Also, various water sources may be used. A particularly suitable one for some situations is the partly cooled or condensed feed water at a large commercial steam power generating plant, which is often available at a temperature of about 100° or more. The present system, using a very cold gas as the aerating and water lifting medium, is efficient in using such water. In fact, the use of water at substantially higher temperature is not as much superior as one might expect. A wide gradient or temperature difference between water and gas temperatures at the point where they are first mixed together is more important than the availability of hotter water. In lieu of water from a steam plant, warm water from ponds, lakes, rivers, and especially from irrigation reservoirs and canals in the warmer parts of the world, is very suitable for use in the present invention. Warm well water or that from other ground formations may of course be used as the main heat source. In a modification mentioned above, very cold liquefied gas such as nitrogen may be introduced in finely divided form into an upflowing stream of the feed water, to effect efficient heat exchange and to rapidly establish dynamic flow conditions. The condensed liquid particles, introduced in finely divided form, rapidly vaporize and they expand very rapidly as they absorb heat from the water, thereby rapidly accelerating the upward flow so that the rising stream, when it enters a quiescent zone at high velocity converts its dynamic flow energy to potential energy, putting it under higher pressure.

A further aspect of the invention is a specific application for raising warm surface or underground water to a higher level, making use of available heat in the water to supply the required lifting energy.

This second modification may involve more or less the same steps as described in connection with the first, where air is used as the working fluid but preferably the second system is used not only to generate motive power or shaft energy but to reliquify the nitrogen and/or to liquify atmospheric air. From such liquid air, various valuable commercial products may be obtained, in addition to the energy, such as liquid or high pressure gaseous oxygen, argon, carbon dioxide, etc., as will be readily understood by those skilled in the art.

To redefine the invention briefly, in a first embodiment, a system and process are described in which a large volume liquid, such as warm water, is raised from a low point by introducing into the liquid a stream of finely dispersed very cold air or other gas to aerate the rising column of liquid. This extracts heat from it, and accelerates its upward flow to a high velocity, thereby imparting considerably dynamic energy to the rising liquid stream. The aerated stream is introduced into a quiescent zone, a closed vessel of substantial capacity, where the entrained gas separates, but both the liquid and the gas are placed under substantial pressure. The pressurized gas is taken to an expander where it does useful work and is very substantially cooled in expanding. This cooled gas is heat exchanged with another stream of gas enroute to a second expander; thereby it is warmed somewhat. It may be discharged to the atmosphere but preferably it is used in the next step to be described.

The water or other liquid in the separating chamber, under substantial pressure and at a relatively high elevation, has substantial potential and pressure energy. It is allowed to flow downwardly at velocity sufficient to aspirate or draw in air or gas supplied through a venturi device. This gas, in the form of fine bubbles, is carried down to the full depth of a subterranean chamber and the bubbles are compressed to put them under the full pressure head of the descending water stream. The gas entrained may equal or exceed by volume the volume of the water. Ratios of four volumes of gas to one of water have been achieved, under standard gas conditions. When the gas is released from the water in the storage compartment, it accumulates under pressure sufficient to hold the water to a level slightly above the outlet. This pressure is maintained by a pressure regulating valve in the water outlet line. The gas is released to flow to a second expander, first passing in heat exchange with the exhaust gas from the first expander, to reduce its own temperature. It is cooled further to very low temperature in passing through the second expander and then is returned to the disperser for aerating and assisting in lifting the water in the first riser column.

The water in the subterranean compartment, which is held under high pressure, may be released through the pressure control valve which stabilizes its level in the storage compartment. Then it is passed through a water motor before being returned to the warm water source or used for other purposes. Thus, there are three sources of motive power or shaft energy, viz., the two gas expanders and the water motor. The first of these normally produces by far the largest amount of energy.

In the second modification system, a cryogenic liquid, such as liquid nitrogen is led through an insulated pipe to the bottom of a deep column of water and is then sprayed upwardly into a rising column to assist that water to rise. Preferably, the nitrogen is still primarily in liquid condition as it enters the water. It is almost instantly vaporized to produce gas bubbles, and the bubbles expand rapidly as heat is extracted from the water and as they ascend under reducing pressure conditions. As a result, the stream flows up at high velocity, achieving high dynamic energy which is converted, to a large extent, to potential energy in the next column where the gas separates from the water and gas and water are stored momentarily. Additional dynamic energy is imparted to the system in a second column within a larger shaft where the water next flows down to great depth, drawing in the same gas again through a venturi or aspirator. This gas is placed under further compression by the descending stream, in this example. Gas and water emerge from the upturned end of this descender column, near the bottom of this larger shaft. The gas separates from water as before and accumulates under pressure above the water level, which is only a short distance above the outlet. This compressed gas may, in part, be drawn off now to flow through a first expander and produce useful power; at least part of it preferaby is passed into another downflowing compressor column wherein atmospheric air is drawn in through a venturi or aspirator from the atmosphere. This air is compressed as before; the water and air separate at the bottom of this shaft as before, and the air is drawn off at the top under control of a pressure regulator, to operate a second expander and be cooled to low temperature. The separated water is passed through a water motor to generate additional motive energy. In addition, if desired, part of the water from the first compressor may be added to that from the second to augment the flow to the water motor. This depends on the relative capacities and flows of the two downflowing water compressor columns.

Additional modifications or variations will be described herein below, being logical extensions and variations of those already briefly described. Further modifications may suggest themselves to those skilled in the art, as this description continues in greater detail. For this purpose, reference will now be made to the accompanying drawings.

BRIEF DESCRIPTION OF DRAWINGS

FIG. 2 is a similar schematic view in elevation of another embodiment, using a very cold liquified gas or cryogenic liquid as the working fluid for extracting energy from a stream of warm liquid.

FIG. 3 is a diagrammatic view, on larger scale, of a device for injecting gas in finely dispersed form into a flowing stream of liquid.

FIG. 4 is a similar view, on somewhat smaller scale of a modified distributor or sparger device.

FIGS. 5, 6, 7 and 8 are similar views of other modifications of spargers or gas distributing devices.

FIG. 9 is a fragmentary detail view of a sparger element, taken along line 9—9 of FIG. 6.

FIG. 10 is a fragmentary view of still another sparger arrangement.

FIG. 11 is a partial view, in elevation, of another modified system based on that of FIG. 1.

FIG. 12 is a partial schematic view of still another modification.

FIG. 13 shows a more specific arrangement for lifting a stream of warm water from a source to a higher level, by making use of available energy in the water itself.

DETAILED DESCRIPTION OF PREFERRED EMBODIMENTS

Figure 1:
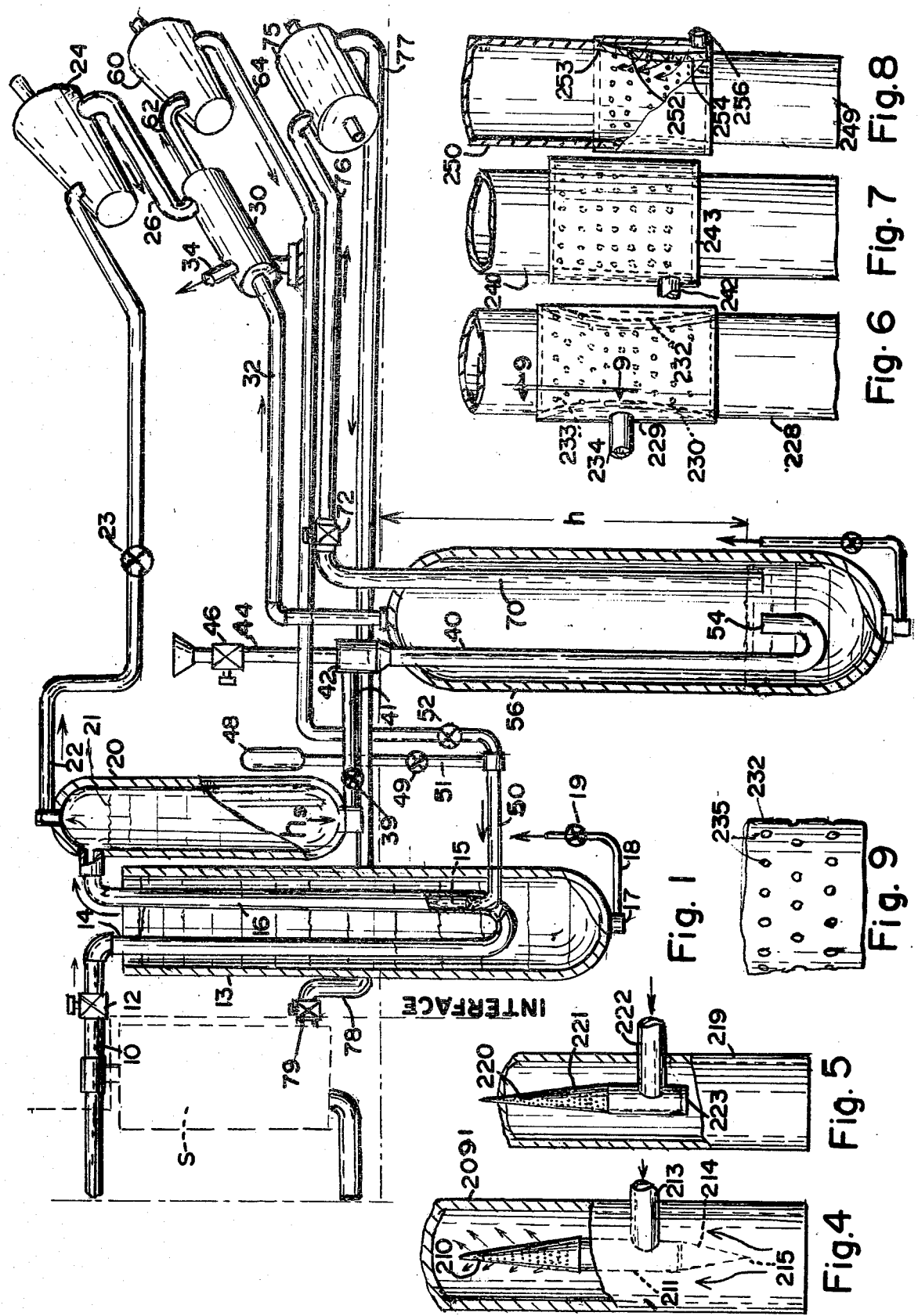
FIG. 1 is a schematic elevational view of one presently preferred embodiment of the invention, designed for recovering energy from a warm water source of substantial volume.

The first embodiment of the invention, shown in FIG. 1, comprises, in general terms, a flow conduit 10 for bringing in a stream of warm water from a source S, under control of a valve 12. The source S, in this case, is preferably the steam turbine condenser water from a large commercial power generating plant, i.e., the cooled boiler water, condensed from the prime movers. In this application, the present invention may at least partially replace the usual cooling towers of such a power plant. The source S, may, however, be any other source of warm water. By "warm" water, it is intended to cover any water supply at a temperature well above freezing and preferably above that of the ambient air. The latter is not always necessary; in some cases, the water may be below atmospheric temperature and still contain substantial recoverable energy. The water usually will be at a temperature below that at which steam or water vapor of significant pressure is available. The water from source S is first caused to flow down to a substantially lower level in a surrounding silo or shaft 13 through a conduit 14. In a commercial installation of large size, this conduit may be from 12 to 20 inches or more in diameter; in other cases it may be larger or smaller. Conduit 14 is the downflow leg of a large U-tube which preferably is 100 feet or more in depth. In a typical installation, it may be about 230 feet in depth, so that the water at the bottom of the U-tube will be under about 100 psig. hydraulic pressure, for example, but these figures are by no means to be considered as limiting. The surrounding enclosure 13 permits access to the U-tube and to other parts within the enclosure. A sump 17 with outlet tube 18 and control valve 19 are provided to draw out any accumulated mud, water, etc., at appropriate times. A gas distributing device or sparger 15 is installed in the bottom part of the riser leg 16 of the U-tube for the purpose of introducing a lifting gas into the upflowing stream of water. The design of this sparger is important. Since the bottom end of the U-tube is under substantial pressure, the lifting gas must be brought in at a pressure sufficient to introduce it into the rising water stream but not enough to flow back up line 14. This gas preferably is at very low temperature, e.g., as low as −100° F. (−73° C.) and preferably lower. The source for such gas will be explained below.

The cold gas, introduced at sparger 15, is finely distributed across the water column so that it will not "channel" or bypass the water. The ascending column of gas and water then becomes a fine foam which grows rapidly less dense and more frothy as the column flows upward. This is due in part to the absorption of heat by the fine gas bubbles from the water, which causes them to expand rapidly; further expansion results from the fact that pressure surrounding each bubble decreases as the column ascends. As a result of these double acting sources of bubble growth, the linear rate of flow up the column increases very greatly so that the column is flowing at a very rapid rate when it emerges from the column into an enlarged and relatively quiet separating zone within a large tank or enclosure 20. Because of this high velocity, the dynamic energy of the rising stream is high. As it enters the quiescent zone 20, this energy is converted to pressure, under Bernoulli's principle. Hence, the water, which separates from the gas in zone 20, with the gas above it, is placed under a superimposed pressure which is substantial. In an exemplary case, if the column 14, 16 is about 230 feet deep, dynamic pressure approaching 100 psig. may be imposed on the water, the gas above it being, of course, at the same pressure. In a typical installation presently under way, this applied pressure is about 85 psig. but it may be more or less, as will be obvious.

The tank or separation zone 20 is also of substantial height and may approach or exceed that of the U-tube 14, 16. The water-gas separating level 21 is near the top, so that a substantial hydraulic pressure head will be imposed on the water at the bottom of tank 20, in addition to the superimposed pressure of the gas above it. This high combined pressure is used to force the water to flow downwardly from tank 20, into a gas compressor unit at high velocity, as will be further explained below.

The gas above the water, which may be air in this particular case, is permitted to flow out through line 22 into a turbine expander 24. This first stage turbine produces substantial motive power or shaft energy and cools the gas (or air) very substantially. It may, in a typical case, be cooled to a temperature as low as −100° F. (−73° C.) or lower. In a typical installation, it is cooled to about −108° F. (−78° C.). The cooled exhaust gas is then passed through line 26 into a heat exchanger 30, where it serves to help cool another stream of gas going into another expander, as described below. The gas may then be discharged to the atmosphere, at a temperature in the general range of −50° to +32° F. (−45 to 0° C.). In an example already referred to and explained more fully hereinafter, the air comes out at −8° F. (−22° C.). If the ambient atmosphere is much warmer than this, it is advantageous to recycle this cooled air to a compressor element next described, as will be explained below.

Meanwhile, as mentioned above, the water in the separating tank 20, under pressure $h_s$, is released to flow out into a venturi device 42 at velocity sufficiently high to entrain a large amount of air or gas from the atmosphere or from some other source. The latter enters through a line 44, under control of a valve 46 which normally is left open. It is closed for start-up, as will be explained below. The volume of entrained air will depend upon operating conditions, but normally should be at least approximate the volume of the flowing water and may well exceed that volume by as much as four fold. Air is measured under standard conditions (14.7 psia, at 0° C.). Under such conditions, air weighs about 0.001293 grams per cubic centimeter; that is, roughly 1/800th the density of water. For a large scale operation, a water flow of 10,000 gallons per minute may entrain up to about 5,000 cubic feet of air (at standard conditions), per minute.

The conduit 40 which carries the water and entrained gas down to the bottom of storage chamber or tank 56, is upturned at 54, at its lower end, to discharge the water-gas mixture into a large enclosed cavity or storage space 56, so that the gas may separate and collect above the water. Water can flow out of space 56, under sufficient gas pressure above it, through a line 70. Such flow is under control of pressure regulating valve 72.

The latter is adjusted to hold the level of water a short distance above the outlet point 54. The gas accumulates above this level at a pressure determined by the pressure on the downflowing stream. As noted above, this pressure is a composite of the pressure in separating tank 20, plus the hydraulic heads of this tank and of tube 40. If the tube 40 extends to a depth of over 200 feet, total pressure on the water column may exceed 200 psig. Under these operating conditions, each gallon of water flow may generate up to one horsepower of energy.

The compressed air in the storage compartment 56 is permitted to flow up and out through a line 32. It passes through the heat exchanger 30, previously mentioned, where the gas (or air) is cooled considerably before it enters the second turbine expander 60. On emerging from this expander which produces useful motive power, the exhaust air has been cooled to very low temperature, preferably below $-100°$ F. ($-73°$ C.). It is taken through a line 64 to the sparger or distributor 15 in the leg 16 of the U-tube to repeat the first part of the cycle, described above.

The water in storage zone 56 is permitted to flow out through riser tube or conduit 70 under control of the valve 72, which maintains the desired constant pressure on the gas above the water as well as maintaining the water level a distance h below a reference level 71. This outlet may be the ground level, at least in some cases. A line 76 conducts the water to a water motor 75 where useful work is done by the water. The spent water is then taken through return line 77 to a connection 78 under control of a valve 79, where it may be conducted at lower temperature than received, to the source. In the case of boiler feed water, this is desirable to avoid processing new water for boiler use. In other cases, the water may not be returned at all but may be used for other purposes.

Typical operating conditions for an exemplary system just described are about as follows:

Water at about 100° F. from the source S is carried down to the bottom of the U-tube by line 14, where it is placed under a hydraulic pressure of, say, 100 psig. As it passes the U-bend, cold gas (air) is introduced at a temperature of about 108° F., being finely and uniformly distributed by an efficient sparger device 15. More details on the sparger will be given below. The air cools the water to about 88° F. as it lifts it up to the separation zone 20, the air (or gas) being heated to this temperature by the water. As the entrained air expands, velocity of this flow is greatly accelerated. In separator 20, the air is collected under pressure now of about 85 psig. It maintains such pressure on the water. If tank 20 is over 230 feet high, it may add up to 100 psig. or more static pressure to the water at its bottom outlet so that water will flow out at high velocity through the venturi 42 and down pipe or conduit 40 to the storage and pressurized zone 56. A large amount of gas is thereby aspirated into this compression device, as previously indicated. The air, at a temperature of about 88° F., is next taken to the first turbine or expander 24 from which it emerges at a temperature of about $-108°$ F. It flows on and through the heat exchanger 30, from which it emerges at about $-8°$ F. and at about atmospheric pressure.

Meanwhile, the water flowing down pipe 40 is at a temperature of about 88° F. at the top, whereas the air or gas introduced is usually and preferably at lower temperature. Preferably, the gas temperature is considerably lower than that of the water. If ambient atmospheric air is warmer, it is advantageous to use the exhaust air from outlet 34 of the heat exchanger 30. In this case, a line 301 is provided, as in FIG. 11, to connect to the tube 44 or venturi 42. With air thus provided to the compressor at a temperature of about $-8°$ F., the water in downflow tube or conduit 40 is first cooled slightly.

However, as the water descends, carrying and compressing the gas or air with it, the latter tends to be heated, by such compression, under the well known gas laws. The compression is essentially isothermic, as the water immediately takes up any differential heat from the gas entrained therein. In the typical example under discussion, the water may be warmed slightly, emerging into the pressure storage zone at a temperature of about 91° F.

No significant temperature change occurs in either air or water in the storage zone 56, so the air or gas upflowing therefrom to the second expander turbine 60 enters the heat exchanger 30 at about 91° F., thereby warming the cool exhaust gas from the first expander to about $-8°$ F., as already stated. The gas in line 62 is a few degrees warmer than this as it goes into the turbine 60. Having been cooled considerably, its volume is reduced before expansion and its temperature is much further reduced during expansion so it emerges from expander 60, at about $-108°$ F., before recycling to the lift section 16 of the U-tube in silo 13.

Overall, then, the water temperature is first reduced from about 100° to about 88° F., but thereafter may be raised to about 91° F., in the example under discussion. The quantity of heat thus recovered can readily be calculated, depending on flow rates, etc.. The efficiency of the exemplary unit overall appears to be about 20%. About 25% of the heat recovered from water in the riser 16 is put back into the water in the compressor column 40; other losses occur in pipe friction, heat exchange friction, and mechanical friction in the expanders and water motor. Nevertheless, the quantity of energy recovered is substantial. And there is no great advantage in using water at a much higher temperature. The wide gradient or difference in air or gas temperature and that of the water at the sparger 15 is by far the greatest factor in determining efficiency over all.

As noted above, sparger design is important. It must distribute the gas well, without large friction losses. A preferred form of sparger, such as used at 15, FIG. 1, is shown in FIG. 3. Here, the sparger 200 comprises an outer collarlike shell 201 and an inner wall 202 which is perforated at 203 with numerous well distributed openings of small size. Wall 202 is spaced radially inward from the outer shell 201 to provide an annular space 204. This sparger is arranged to bridge a gap between a conduit section 207 below of relatively smaller diameter and an upper section 208 of relatively large diameter. Gas is supplied through line 209 to the annular space 204. Liquid rising in conduit 207 entrains the gas coming in through the openings 203 and, since velocity of flow in the center is more rapid than near the conduit walls, part of the entrained gas flows towards the center so that uniform flow throughout the cross section of the upper conduit 208 is rapidly achieved. FIGS. 4 to 9 show other examples and details of sparger designs; these will be described in detail later herein.

A second modification of the invention is shown in FIG. 2. A supply of liquid nitrogen, or other very cold liquefied gas, is held at a level $h_1$ above an outlet point far below. In this case warm water is brought in at the upper right through line 80 into a receiving tank 82 from which it flows down a distance $h_2$ into a deep cavity 84 several hundred feet below the entrance 80. This establishes a head $h_1$ below the tank or vessel 89 containing the cryogenic liquid, i.e., a very low temperature liquefied gas. An insulated tube 87 carries this very cold liquid without substantial evaporation and under control of a valve 90 down to the bottom of the cavity or chamber 84 where it is upturned in a U-bend 91. A sparger or distributor device 92 which may be like device 200 already described, having fine and well distributed holes, permits the cold liquid to flow out into the lower end of a riser conduit 88 through which the water flows up, being assisted by the rapidly evaporating cold fluid from the sparger 92. Bubbles of gas are thus entrained and well distributed so that they will not channel, and the frothy mass of water and gas accelerates greatly in velocity as it flows upwardly with the gas bubbles taking up heat from the water and expanding rapidly.

Tube or conduit 88 bends to the left at its upper end 95 to enter tangentially into a second main shaft or vessel 96. The upper part of this second vessel is partitioned at 104 from its lower section to provide a separation zone 97. As the gas-liquid froth enters tangentially at high speed into separation zone 97, the gas and water are essentially separated by centrifugal force in this relatively large volume quiescent space, the gas flowing upwardly and then down into a central tube 101. The water flows through a restricted passage at the lower end of tube 101 with an aspirating effect to draw the same gas into it again and then proceeds to flow down through conduit 105 to the bottom of the shaft a distance $h_3$ to a level near its bottom and more or less at the same level $h_1$ where the gas was released through sparger 91 in the first tank or cavity 84. In this way the gas is recompressed or further compressed, i.e., it is put under additional pressure above that it received at the separation zone above level $h_3$.

The gas-water mixture is released at the upturned end 106 of downflow conduit 105 and the water collects up to the bottom level $h_3$, being under back pressure of the gas which collects above it. The cavity or shaft 96 thus holds water at the bottom level $h_3$ and contains compressed gas above this level. This gas has now been doubly compressed because of original pressure at the top, in compartment 97, and the added pressure put on it by its descent under compression in shaft or conduit 105. It flows out at 117 into a conduit 116 which takes it, under control of a back pressure regulating valve 115, into a turbine expander 120 where useful shaft energy is obtained. The gas is cooled in this expansion and is taken into a liquefaction and separation unit 122, as will be further described.

Meanwhile, the water at the bottom of shaft or storage zone 96 is permitted to flow out and upwardly through outlet line 109 from which it flows to the left into another centrifugal separation unit 113 around an air inlet tube 133. The water flows down from this level through a restricted passage around the lower end of tube 133, thus aspirating atmospheric air into the downflowing water stream into a conduit 132 which acts as another compressor, taking air and water down to level $h_5$. Some residual gas from previous stages may be included. However, part of the water may be released through a pressure control valve 108 at top level $h_4$ to flow to and through a water motor, 110 for generation of power. Valve 108 may be set to divide the stream as desired, or it may be closed so that all the water returns to the compressor column 132. The downflowing stream is turned up at the upturned end 134 of column 132, the gas (air) is compressed above a predetermined lower level 136 at the bottom of level $h_5$, and water is held under pressure below this level, in compartment 135. From this storage compartment, the water flows upwardly through conduit 140, under control of pressure regulating valve 142, to drive the water motor 110. As noted above, this water stream may be reinforced by water flowing from riser 109 under control of valve 108.

Gas which collects under pressure above the level 136 is taken under control of pressure regulating valve 144 through a line 146 to the second expander 147 where it produces useful mechanical energy. It is cooled in this expansion and emerges into the air and gas liquefaction unit 122. Here, gas and air are both liquefied, and fractionating equipment 122, of conventional design, not a part of this invention, is used to separate the oxygen, nitrogen, argon, etc., to recover useful products and to provide the liquid nitrogen for tank 89, used in the first step of this modification. The nitrogen is returned to tank 89 through a line 125.

In the modification just described, the temperature differential between the water, which may enter at a temperature of about 100° F. (73° C.) and the nitrogen in liquid state at about −325° F. (−198° C.), is much greater than that given above in the first modification and the efficiency is correspondingly increased. Furthermore, more heat is taken from the water, due to latent heat of evaporation required to gasify the very cold liquid from tank 89. Also, by recompression, higher gas output pressures are realized and still greater efficiency results at the expanders. A major advantage is that valuable by-products from air liquefaction and fractionation can supplement the energy product.

Returning now to the spargers and gas distribution in general, FIG. 4 shows a tapered sparger inserted into a conduit or air lift device analogous to the arrangements 15 in FIG. 1 or 92 in FIG. 2. In conduit 209, which corresponds to conduit 16 of FIG. 1, the upper part of the sparger is cone shaped at 210, above a cylindrical portion 211 and a lower tapered part 214. Gas enters through line 213 and liquid is diverted beginning at point 215 to sweep along the sides of the sparger and pick up the emerging gas (through small orifices in the conical part 210) with enough turbulence to mix well without materially impeding upward flow of the liquid. This device can be used at 15, FIG. 1, or at 92, FIG. 2.

FIG. 5 shows a rather similar device 220, with perforate upper conical part 224 centrally located within the conduit 219. Gas is brought in through line 222. The lower end of the sparger, which is imperforate, is squared off for greater turbulence, to insure good mixing as the liquid from below sweeps past the small emerging jets of gas in the upper conical part. This affords excellent mixing, at the expense of some turbulence in the liquid stream, which increases flow friction to a small extent.

FIG. 6 shows an arrangement similar to that of FIG. 3, applied to a riser conduit of uniform diameter 228. The sparger 230 has an outer cylindrical wall 229, an inner wall 232 annularly spaced inward from wall 229, the inner wall being perforated, as shown in more detail in FIG. 9. Perforations 235 may be of the order of one-sixteenth to one-eighth inch in diameter, for medium diameter conduits 229, corresponding to riser 16, FIG. 1 or riser 88, FIG. 2. The inner wall 232 is curved inwardly to restrict the flow and cause it to accelerate, then flares outwardly for the reverse effect. The changes in liquid stream velocity which result from this, plus minor turbulence, effect good mixing and dispersion of the gas bubbles introduced by supply line 234, which introduces the gas or air into the annular space.

FIG. 7 shows a sparger made of an outer sleeve 243, large enough to leave an annular space outside the wall 240 of the conduit. This wall is perforated in much the same manner as shown in FIG. 9, so that gas introduced by supply line 242 into the annular space flows in through the perforations in wall 240, the gas bubbles then sweeping along with the liquid with good distribution being effected by the faster flow in the center of the conduit 240. The upper and lower ends of the outer sleeve 243 are of course sealed to the conduit wall 240 to make the annular compartment gas tight except for the perforations into the conduit.

The arrangement in FIG. 8 is similar to that just described, except that the lower part of the conduit 249 is of smaller diameter than the upper part 250. The junction 254 between these parts constitutes the inner wall of the sparger and is curved, like the arrangements of FIGS. 3 and 6, to achieve good distribution by variations in stream velocity. The inner wall, which is part of the conduit, is perforated at 252 and the gas is supplied by line 256, as in the previously described spargers.

FIG. 10 shows still another arrangement designed to be self regulating. In this case, the sparger 259 comprising a perforate part of conduit 260 extends across a boundary B between liquid below and gas above, which boundary may shift vertically, from time to time depending on the relative pressures of gas and water. A sleeve 262 annularly spaced around conduit 260, is sealed to it at the top. Its bottom end 263 is open to the liquid. If the boundary line between gas and liquid rises, less gas is admitted because the liquid shuts off some of the openings 261 through the wall 260 of the conduit. If the level falls, more openings are exposed and more gas flows in. This tends to reduce the pressure on the liquid, which then tends to rise to close off some of the openings and restore equilibrium. In other respects, this device operates in the same way as FIG. 7.

From the above description, it will be apparent that the processes described are somewhat "bootstrap" in nature, that is, that they are not ordinarily self-starting. If very cold air under some pressure is available for the system of FIG. 1, or if a previously prepared supply of liquid gas at very low temperature is available for that of FIG. 2, the mere injection of the very cold substance into the water might start an upflow that will get the whole system moving. In most cases, however, a start-up procedure and a certain amount of stored energy to get the system moving will have to be introduced. The key, or one of the keys, to the operability of the system involves very rapid upward flow in the gas lift column, such as the riser leg 16 of the U-tube of FIG. 1, or the first riser in the system of FIG. 2.

As shown in FIG. 1, a start-up tank 48 is provided, being connected by line 51 to inflow line 50 which supplies the very cold gas to the sparger 15. At the outset, presumably, there is no very cold gas available. By opening valve 49, the compressed gas, which may be condensed as a cold or very low temperature liquid, e.g., liquid air or liquid nitrogen, will flow through the sparger 15. A check valve, shown at 52 will be provided in line 50 to the right of the start-up gas line 51, to prevent the start-up gas from flowing in the opposite direction. This cold gas, cooled by its expansion if not originally cold, enters the sparger and causes the column of water in the U-tube 14, 16, to start moving up towards gas separator vessel or chamber 20. The flow increases in velocity as the gas is warmed and accelerates as it approaches the top so kinetic energy is developed in riser line 16. When the foamy gas-water mixture enters vessel or chamber 20, pressure begins to build up there. A valve 23 may be closed in line 22 to hold the gas until some significant pressure is built up; however, in many cases, depending on design, the expander motor 24 will hold back the gas flow until pressure is high enough to turn this motor over. In either case, pressure ultimately reaches a level in chamber 20 such that the gas begins to flow out through line 22 and through the first expander 24. As it emerges, this gas has been cooled perceptibly and will begin to exercise a cooling effect as it flows through the heat exchanger 30.

Water in the lower part of the separation chamber 20 is next released, e.g., under control of a valve 39 in line 41, so that this water, under pressure of its own head, plus that of the gas above it, starts operating the aspirator 42. Valve 46 is opened and air starts flowing down tube 44 to be drawn into the downflowing stream of water in line 40. As this water descends, partly by gravity, the air entrained therein is compressed and the air-water mixture emerges upwardly into cavity 56 from the upturned end 54 of the line 40. The air separates from the water here and accumulates in the upper part of storage zone 56. As soon as the pressure in storage chamber 56 reaches a sufficient level, valve 33 is opened and this gas flows through heat exchanger 30, where it is cooled somewhat, and on through the second expander motor 60 where it is cooled much more. The effluent gas from this expander now is beginning to be effective to take up heat and accelerate liquid flow, having been cooled substantially, and it may be allowed to start flowing through sparger 15. At first, it may be necessary to mix some gas from the second expander with gas from the starter 48, but as soon as the system gets going, the starter may be shut off, by closing valve 49. Flow will gradually accelerate to the normal working level. For the exemplary system described above, the start up time is of the order of about one hour. It may be more or less in other installations, depending on size, temperature of water and ambient atmospheric air, starter gas temperature, pressure, etc. After full start up has been accomplished, the system operates in the manner previously described.

For the embodiment of FIG. 2, as already suggested, the use of liquid nitrogen under pressure will ordinarily be the only start-up energy source required. As soon as valve 90 is opened, the column 87 and silo or cavity 84 having been filled with warm water from line 80, the injection of liquid nitrogen through sparger 92 commences at the bottom of upflow line 88. Immediately, on contact with the water, the gas is vaporized, and bubbles start upward, moving the water with them. Continuing flow of the liquified gas adds more and more bubbles and these expand rapidly, so that the water is column 88 is soon in rapid upward flow, being greatly accelerated as it comes to the top of column 88. The kinetic energy thus acquired is converted to pressure energy, or potential energy, in the cavity of container chamber 97. Water separates from the gas, starts flowing down through the restricted annular opening between tube 101 and the flaring partition 104, thus aspirating the gas above through tube 101 into the downflowing water stream. This puts the gas under additional pressure and the mixture of water and gas emerges from downcomer 105 at 106, where the entrained gas separates and rises, under pressure, above the water lower level $h_3$. This gas is drawn off at 117, 116, and the water flows up line 109, continuing the process as described above.

FIG. 11 shows a modification where cold gas is led into the compressor 40. The system of FIG. 11 operates in the same manner as that of FIG. 1, except that the relatively cool gas from the heat exchanger 30, which has extracted some heat from the gas into the second expander 60, is used to supply the aspirator gas to the device 42 for use in the descending gas compressor 40. A line 301 having a control valve 302, connects the exhaust to the aspirator. When ambient air is colder than the exhaust from the heat exchanger (at 34, FIG. 1) this connection is not needed. In many cases, the ambient atmospheric air will be warmer than desired, and it may often be warmer than the water which serves as the main heat source. In such cases, the advantage of recycling color air from the heat exchanger 30 will be obvious.

Line 301 connects outlet 34 to the line 44. Valve 302 is provided, along with valve 46, to enable atmospheric air to be mixed with the return air from outlet 34 if desired. In other respects this system is similar to FIG. 1 and the same reference characters are used for similar parts.

In the system of FIG. 11, just described, there is no discharge of air or gas to the atmosphere, assuming that valve 46 is closed. During start up, of course, the system will have to be charged in some manner, as described above. Thereafter, assuming no further air or gas is introduced, the system is closed, the working air or gas being continually recycled. In a similar sense, the system of FIG. 2 may be considered a closed system, so far as the liquefied gas cycle is concerned. The air introduced at 133 into the venturi or aspirator 130 is taken out as products from the liquefaction and separation or fractionation unit 122. In other respects the gas in this system is recirculated in the same manner as that in FIG. 11.

FIG. 12 shows a system which is "closed" so far as the water or liquid flow is concerned. In this case, the water, or other liquid, which circulates through the system obviously is not a source for heat or energy. This is supplied by a stream of hot fluid, such as flue gas, from a combustion plant or heat source of any type that is large enough to supply such heat in quantity. The heat supplying gas is introduced at 321 into an aspirator 322, operated by the recirculating water or liquid flowing through line 323 from a water motor 325 which is in all essential respects similar or analogous to the motor 75 of FIG. 1. The gas and water mixture are taken from aspirator 322 down through compressor line 327 into pressure storage cavern or vessel 330 where the upturned end 328 of the line 327 discharges gas and liquid upwardly. Water separates below the boundary line 331, with gas accumulating under pressure above this boundary. The gas can be led off through line 333 to a recompressor which comprises an aspirator or venturi 345, operated by liquid coming under pressure through line 341 from a separator tank 340 which in all essential respects is like tank or vessel 20 of FIG. 1. The gas and liquid mixture flows down recompressor conduit 342 which turns up in the bottom of second pressure cavern or vessel 344 to discharge the gas above boundary level 396, the water settling below this level. From cavern or vessel 344, the gas is led off to a second stage expander 360 through line 332, passing in heat exchange with the exhaust from a first expander 350 is heat exchanger 352 which is similar to heat exchanger 30 of FIGS. 1 and 11. As in the previous examples, this gas is cooled to very low temperature in expander 360 and it is returned through a line 364 to a sparger 361 in a line 366 through which water or liquid flows out of cavern or vessel 330 up and into gas separator chamber or vesse 340. The effluent gas from vessel 340 flows through line 272 to the first stage expander motor 350 and exhausts to the atmosphere at 334 after passing through the heat exchanger, this part being the same cycle as in FIG. 1. Gas from the second cavern or vessel 344 flows up through line 332 and through the heat exchanger 352 to the second expander motor 360 as just noted, and is returned at very low temperature of the sparger 361. However, the gas from the first expander 350 is not recycled, in the system shown. It could obviously be recycled in a manner analogous to that of FIG. 11 if desired. From the washed flue gas or other heat-supplying fluid, soluble components may be recovered from sump 390, through line 391, via valve 392.

The second stage compression in FIG. 12 is advantageous where the low level caverns or vessels which hold the air or gas under pressure and in storage, and the liquid below, require excavation. The depth of excavation may be less than would be required for a single stage compressor such as in FIG. 1. In any case, the separate vessels such as 13 and 56 in FIG. 1, 84, 100 and 135, FIG. 2, with accompanying riser shafter or conduits 109 and 140, etc., and the caverns or vessels 330 and 344 of FIG. 13, may be placed in a single excavation in each case, as will be obvious. Water or liquid from the bottom of vessel 344 flows through line 376, through water motor 325, and returns through line 323 to aspirator 322.

It will readily be apparent to those skilled in the art that other substitutions and modifications may be made in each of the embodiments described, that components of one modification may be transferred over to another, and that variations in design may be made in any or all of these modifications within the skill of the art and without departing from the spirit of the present invention. Various sources of warm water or of means for warming water or other liquid (as just described in connection with FIG. 12) may be used. The disposal of the spent heat source, whether gaseous or liquid, may be made in various ways and for different purposes. The water, in the open cycle water systems of FIGS. 1, 2, 11 and 13 may either be returned to the source or used for various other purposes. The heat supplying gas of FIG. 12 can be stripped of valuable components, such as unburned hydrocarbons, carbon dioxide, etc., before being discharged to the atmosphere, or it may otherwise be disposed of.

FIG. 13 shows a self operating or "boot strap" type operation in which warm water is self lifted from an underground aguifer. It can be applied, obviously, to bodies of water at or above ground level that are to be lifted to a higher elevation. The water at its natural level is either placed under a head or the pump system is immersed into it to a "submergence level" at which an air lift or gas lift operation will bring the water to the desired surface or higher level. The same combination of steps and apparatus are used as described above, with minor substitutions and modification in some of the flow routings. The expanders, or at least one of them, is in form of a thermal gas separator of known type. Major operating components, where convenient, are given the same numbers as in FIGS. 1 or 11, preceded by the numeral "4".

Warm water at a deep underground level, as in a well, 400 is lifted through line 416 by injecting into it through sparger 415 a stream of very cold gas in volume and at pressure sufficient to cause the water to flow upward. As the gas takes heat from the water and expands, due both to increased heat and to reduced pressure, the stream accelerates rapidly, attaining high kinetic energy, and is passed into a quiescent separator tank or zone 420 at (or above) ground level GL. The kinetic energy is converted to pressure or potential energy, as the flow emerges into the comparatively quiescent tank 420. Air (or other gas) separates under pressure above the water level L in this tank.

The air is taken through an outlet line 422 to the primary expander 424, entirely analogous to expander 24 in the previous Figures, except that this expander, instead of being a turbine, is a vortex type thermal gas separator. The gas enters the smaller end of a generally conical or frusto-conical chamber where it flows at high velocity in a spiral path, ever expanding and cooling, so that the cooler and heavier part of the gas is separated from a warmer fraction by centrifugal force, the cooler gas emerging from the periphery at the larger end of the vessel, and the warm fraction passing out more or less at the axis of the device. This device is no part of the present invention and will not be described in further detail, being well known in the art.

The colder fraction of the gas, thus obtained, is next taken through outlet line 426 to a heat exchanger (HX) 430, where it is used to cool another stream of gas flowing up through line 432 from a deeply placed pressure and storage chamber 401, analogous to chamber 56 of the previous Figures.

From HX 430 where it partly cools the pressurized gas from the deep tank, the gas stream is passed through line 402 into fluidic venturi or aspirator 442, where it is entrained into the downflowing stream of water in line 440, exactly analogous to the operation in line 40 described above, FIGS. 1 and 11.

Meanwhile, the partly cooled gas from below passes from HX 430 to a secondary expander 460 in the form of another thermal gas separator and expander of the same general type as 424. In some cases, it may be possible to substitute a turbine, such as 60, for this secondary expansion step, depending on relative air and water temperatures, depth of aquifer, height or lift, etc. This partly cooled gas is cooled further in the secondary expander and is returned through line 450 to sparger 415 to repeat that part of the cycle, as just described.

The gas flowing down column 440 with water, which is taken from separator through a line 427 into the venturi 442, is put under heavy compression. It separates, in the manner explained above, above the upturned end of the descending compressor column 440, accumulating under pressure above the water level $W_2$ in tank 401. From here it flows up line 432 into the heat exchanger HX. A pressure control valve, not shown, may be placed in this line, if desired, to regulate the pressure in the storage tank 401. From the heat exchanger, it is again cooled and returned to the tank 401 as before.

The warmer fraction of air from the primary expander 424 is taken overhead through a line 403 and introduced into the aspirator or venturi 442 for recompression and return to the tank 401. Along with it, a warm fraction of air or gas from the secondary expander of thermal gas separator 460 is also recycled to the same compressor column and tank. Compare expanders 424 and 460 respectively with expanders 24 and 60 of FIGS. 1 and 11.

The system so far described is not self starting. A starter ST is indicated at 448. It may be either an air compressor or a tank of compressed gas in volume and pressure sufficient to start the water column moving briskly up line 416 to develop kinetic energy in this stream and convert it to pressure energy in the separator 420. As this pressured gas is released through the expanders, or thermal separators which are also expanders and, to some extend, heat exchangers also, it gradually becomes colder and colder as recycled to the sparger 415. It soon reaches a level where it can extract enough heat from the water to keep the system moving. Then the starter can be turned off by valve $V_1$, valve $V_2$ being appropriately opened or reset, as needed to supply line 450 with the necessary cold air.

Product water is taken into outlet line 411 through line 477 from the deep tank 401. Originally, of course, it comes from the aquifer through line 416, separator 420, line 421 aspirator 442 and compressor column 440 into tank 401. Supplemental water may be available from line 421 into line 411, under controlling pressure regulating valve 412. This will depend on relative water and air temperatures, the height to which the water is to be lifted, relative flow rates, efficiencies of the various units such as heat exchangers, expanders, etc., as will be obvious.

Operation of a gas lift pump, as in line 416, requires a "submergence ratio" between about 45% and 55%. That is, the ratio of the distance $h_{12}$ of sparger below water level W to the height of lift, which is $h_{12}$ plus $h_{10}$, should be within these limits. In an example currently under construction, water level in the well 400 stands at about 330 feet below ground level GL. This is $h_{10}$, FIG. 13. In the same Figure, the distance $h_{12}$, i.e., depth of sparger below normal water level, is about 370 feet, requiring a lift from the sparger of about 700 feet. The submergence ratio is than 370/700 or about 53%. Thus, the system allows for some fluctuation in ground water levels.

Under some conditions, as suggested above, one of the expanders may be replaced by a turbine or motor which can produce some useful shaft power. That is, the secondary expander 460, for example, might be replaced by a motor such as 60, FIGS. 1 or 11. This will depend on relative water and cold air temperatures that can be obtained, as well as an other operating variables, including flow rates and the like. In the system of FIG. 13, just described, no motive energy is obtained. The system has the advantage, however, that there are no mechanical moving parts and maintenance is at a minimum. This also lends itself to practical use in remote areas where electric power is expensive or unavailable.

As noted above, all the systems or modifications described have many features in common. The water, or other liquid, is under at least some pressure at the point where the sparger introduces the lifting gas. Its temperature is considerably higher than that of the lifting gas, so that the latter extracts considerable heat energy, which it converts to kinetic energy, and then, as the flow slows down to a virtual halt, this kinetic energy is converted, at very high efficiency, into pressure or potential energy. The gas, under pressure, is expanded, primarily to cool it, power being taken off as available. This cooled gas, or other gas if reasonably cool, is fed into a downflowing compressor column where the water is under enough pressure to take the gas down to a deeply positioned storage zone. The pressure must be sufficient to overcome the buoyant effect of the gas entrained in the downflowing water stream. Gas is accumulated at the deep level above the water, is passed through an expander and cooled, preferably being assisted in cooling by the cooling effect of the first or primary expander on the gas taken from the water lift operation.

It will readily be understood that various modifications and variations may be made in addition to those particularly described above. It is intended by the claims which follow to cover all such variations, modifications, adaptations and changes as would readily occur to one skilled in the art as broadly as the state of the art properly permits.

What is claimed is:

1. The improved process of extracting useful energy from a supply of liquid which is at temperature well above its freezing point but below its normal boiling point, which comprises the following steps, in combination:
    (a) Continuously flowing a stream of said liquid from a relatively lower level upwardly by injecting a well dispersed stream of gas bubbles into said liquid stream, said bubbles being at substantially lower temperature than said liquid, thereby to extract heat from said liquid and causing the bubbles to expand, thereby accelerating the upward flow of said liquid and gas mixture to impart substantial kinetic energy to said liquid and gas, and
    (b) Directing the accelerated stream of gas and liquid into a quiescent separating zone where velocity is greatly diminished, whereby said kinetic energy is substantially converted to potential or pressure energy.

2. Process according to claim 1 wherein the gas and liquid are substantially separated, with the gas rising above an interface level in said space and liquid standing below said level which includes the further step of passing said gas from said space through an expander motor to produce useful power and to cool said gas as it expands.

3. Process according to claim 2 which includes the further step of passing a stream of liquid from said space through a descender column at velocity sufficient to aspirate a gas into said stream, and continuing downward flow of said stream to place said gas so aspirated under compression.

4. Process according to claim 3 which includes the further step of permitting said aspirated compressed gas to separate from said liquid in a quiescent storage zone while under said compression, allowing the liquid to settle and accumulate below said gas, and thereafter passing said compressed gas from said storage zone through an expander motor to produce useful power and to cool said aspirated gas.

5. Process according to claim 1 which includes the further step of passing a stream of said liquid from said separator space through a descender column at velocity sufficient to entrain or aspirate a gas into said stream, and continuing the downward flow of said stream to place the aspirated gas under compression by said liquid.

6. Process according to claim 5 in which the aspirated gas under compression is passed through an expander motor to produce useful energy and is cooled in expansion, with the further step that the cooled gas so obtained is injected into the upward flowing liquid stream.

7. Process according to claim 1 in which the gas bubbles are supplied from cryogenic liquid as a gas source.

8. Process according to claim 7 in which the gas is reliquefied and recycled in a closed cycle.

9. Process according to claim 7 in which atmospheric air is introduced to supplement the cryogenic liquid wherein the process includes the step of liquefying and fractionating said air.

10. Process according to claim 1 which includes the further steps of passing the gas from said quiescent zone through an expander to produce useful energy and to cool said gas, and passing a stream of water from said quiescent zone downwardly at high velocity, entraining gas in said stream and compressing it by said downflowing stream, and finally recycling the thus compressed gas through an expander and back to said first named lower level and injecting it into said upwardly flowing stream of liquid.

11. Apparatus for extracting heat from warm liquid which is below its boiling point which comprises the following elements, in combination:
    (a) A riser column for conducting a stream of said liquid from a level where it is under at least some pressure tending to move the liquid into said conduit to a higher level,
    (b) Means for injecting a stream of cold gas into said conduit and into the stream of liquid therein in a manner to form numerous discrete bubbles of gas in said stream so as to aerate said stream and start it rising in said column, whereby the gas will extract heat from said warm liquid and expand to accelerate upward flow and thereby generate kinetic energy in said stream,
    (c) A separator and storage vessel at said higher level adapted to receive said accelerated stream from said conduit and to slow its velocity very substantially, thereby converting kinetic energy to pressure or potential energy, and putting the gas and liquid under static pressure, and
    (d) Means connected to said separator storage vessel for expanding said pressurized gas and cooling said gas while recovering useful energy therefrom.

12. Combination according to claim 11 in which the expander means includes a device for obtaining a cooler fraction of said expanded gas and means for passing such cooler gas to a water extraining column.

13. Combination according to claim 11 which includes means for lifting water from an underground source and extracting heat therefrom to operate said lifting means.

14. Combination according to claim 11 which includes a downwardly descending liquid column connected to said separating and storage vessel below the water level therein, whereby said water can flow downwardly in said descending column at velocity great enough to aspirate a stream of gas into said column and carry said aspirated gas down said column.

15. Combination according to claim 14 which includes an expander motor and means for conducting said compressed gas from said closed cavity to said motor to produce useful work and to cool said gas to a temperature substantially below that of the water in said cavity.

16. Combination according to claim 13 which includes means for returning said cooled gas to said first named injecting means.

17. Apparatus according to claim 11 which includes an expander motor through which pressurized gas is passed from said separator vessel, a gas compressor below said separator vessel and connected thereto for flow of liquid from said vessel through said compressor, means for aspirating a gas into said compressor, and a chamber for separation and storage of said compressed gas at a lower level.

18. Apparatus according to claim 17 in which a second expander motor is connected to said gas in the lower level, means for controlling the flow of gas through said second expander motor to cool said gas, and means for returning said cooled gas from said second expander motor to said dispersing means in said riser column.

19. Apparatus according to claim 11 which comprises a source of supply of a cryogenic liquid, means for connecting said source to said dispersing means, and means for controlling flow of said cryogenic liquid to spray said cryogenic liquid into the riser stream, thereby to extract heat from said warm liquid by evaporation of said cryogenic liquid.

20. Apparatus according to claim 19 which includes means for reliquefying said cryogenic liquid and means for continuously recycling at least a part of said cryogenic liquid to said dispersing means.

21. Apparatus according to claim 20 which includes means for aspirating atmospheric air into the circulating stream of original liquid and means for liquifying said air, said last means being operated by energy derived from the original liquid.

* * * * *